US006956962B1

(12) United States Patent
Hayosh

(10) Patent No.: US 6,956,962 B1
(45) Date of Patent: Oct. 18, 2005

(54) SYSTEM AND METHOD OF SIGNAL PROCESSING FOR USE IN READING DATA

(75) Inventor: Thomas D. Hayosh, Bloomfield Hills, MI (US)

(73) Assignee: Unisys Corporation, Blue Bell, PA (US)

( * ) Notice: Subject to any disclaimer, the term of this patent is extended or adjusted under 35 U.S.C. 154(b) by 701 days.

(21) Appl. No.: 10/140,587

(22) Filed: May 7, 2002

(51) Int. Cl.[7] .......................... G06K 9/00; G06K 9/18; G06K 9/46; G06K 9/40; G06K 9/64
(52) U.S. Cl. ...................... 382/139; 382/278; 382/265; 382/182; 382/207
(58) Field of Search ............................... 382/137–140, 382/278, 265, 182, 207

(56) References Cited

U.S. PATENT DOCUMENTS

| 3,978,450 | A | * | 8/1976 | Sanner et al. ................ 382/320 |
| 3,986,000 | A | | 10/1976 | McJohnson ............ 235/462.27 |
| 4,087,789 | A | | 5/1978 | Beery |
| 4,143,355 | A | | 3/1979 | MacIntyre |
| 4,143,356 | A | * | 3/1979 | Nally .......................... 382/139 |
| 4,356,472 | A | * | 10/1982 | Hau-Chun Ku et al. .... 382/139 |
| 5,091,961 | A | | 2/1992 | Baus, Jr. |
| 5,134,663 | A | | 7/1992 | Kozlowski |
| 5,150,425 | A | | 9/1992 | Martin et al. ................ 382/161 |
| 5,159,644 | A | | 10/1992 | Martin et al. ................ 382/161 |
| 5,204,914 | A | | 4/1993 | Mason et al. ................ 382/161 |
| 5,410,401 | A | * | 4/1995 | Shofner et al. ............... 73/160 |
| 5,887,075 | A | | 3/1999 | Kruppa |
| 5,959,279 | A | | 9/1999 | Komatsu |
| 6,025,711 | A | * | 2/2000 | Demma et al. ........ 324/207.26 |
| 6,327,378 | B1 | * | 12/2001 | Ball ........................... 382/137 |

OTHER PUBLICATIONS

K.G. Beauchamp, "Signal Processing Using Analog And Digital Techniques," (New York: John Wiley & Sons, 1973), pp. 400-467.

\* cited by examiner

Primary Examiner—Brian Werner
Assistant Examiner—Shefali Patel
(74) Attorney, Agent, or Firm—Lise A. Rode; Mark T. Starr; Brooks & Kushman P.C

(57) ABSTRACT

A method of signal processing for use in reading data includes determining first and second waveforms, determining a cross-correlation of the first waveform with the second waveform, and determining a specific time delay corresponding to a maximum peak in the cross-correlation function. A filter is then applied based on the specific time value. The filter combines the first waveform and the second waveform so as to generate a filter output waveform including coherent information representing the data and including reduced incoherent noise.

16 Claims, 8 Drawing Sheets

| | | | |
|---|---|---|---|
| 1 | 2 | 3 | 4 |
| Character One | Character Two | Character Three | Character Four |
| 5 | 6 | 7 | 8 |
| Character Five | Character Six | Character Seven | Character Eight |
| 9 | 0 | ⑁ | ⑀ |
| Character Nine | Character Zero | Symbol R-T | Symbol Amount |
| ⑃ | ⑂ | | |
| Symbol On-Us | Symbol Dash | | |

FIG. 1

Character 1

Character 2

Character 3

Character 4

Character 5

Character 6

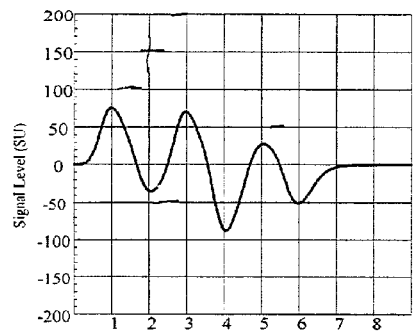
Character 7
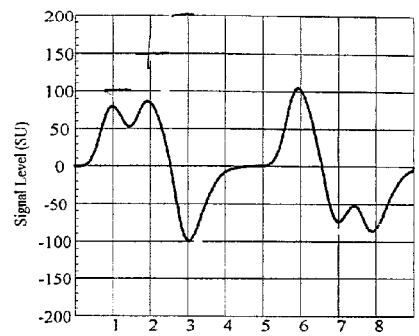
Character 8
Peak No.
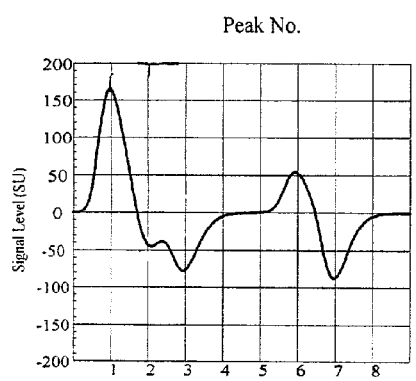
Character 9
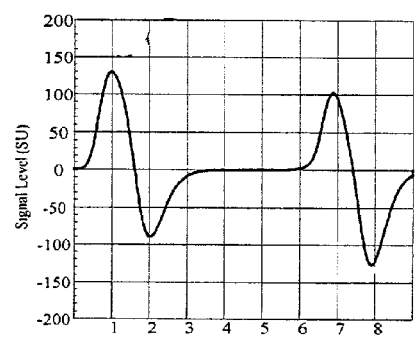
Character 0
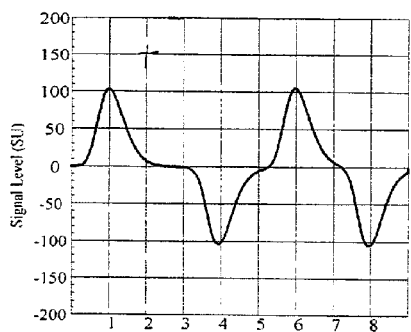
Character :
FIG. 2B
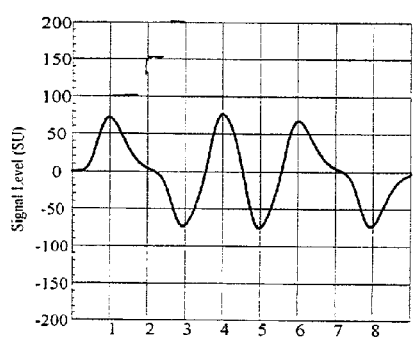
Character "

Character "ı"

Character "ııı"

SYSTEM AND METHOD OF SIGNAL PROCESSING FOR USE IN READING DATA

BACKGROUND OF THE INVENTION

1. Field of the Invention

The present invention relates to a method of signal processing including correlation analysis, and to magnetic character recognition methods.

2. Background Art

Banks, credit unions and other financial institutions regularly process checks, deposit slips, and other types of bank documents in order to execute financial transactions efficiently. Document processing systems have therefore become quite prevalent in the industry. Typically, information will be printed on these documents in magnetic ink which can be read both by the human eye and a computer. This form of printing is read by a process called magnetic ink character recognition (MICR). As part of the recognition process, a MICR magnetic read head is used to read the information printed on the document. Since the late 1950s when MICR was first introduced in banking, MICR reading was mostly performed in high-speed reader/sorters located in the central processing centers of financial institutions. Paper documents, namely checks, were deposited by account holders and initially processed by the depositing bank by performing a "proofing" operation where the debits would be equal to the credits, i.e., the deposit ticket including cash in and cash out slips. All checks that were drawn on other banks were high speed sorted by MICR reading only the amount field and routing fields, assembling items drawn on a single bank into bundles with a cash letter wrapping, and then physically transporting them to other banks by auto or airplane depending upon whether the other banks were local or distant. In many cases items drawn on all distant banks were grouped into a single large bundle and sent to the local Federal Reserve Bank for further processing and final distribution for presentment to the paying bank. Typically, documents read by these subsequent institutions have a MICR "can't read" rate lower than 2% after they have been high speed processed by the bank of first deposit. Documents with "rejects" in the MICR line are repaired with a bottom strip which is re-encoded with the MICR information or inserted into a carrier envelope where the MICR line data is also re-encoded in the proper location on the envelope.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to each MICR character and the MICR character peak profiles as contained in the ANS X9.27-2000 "Print and Test Specifications For Magnetic Ink Printing (MICR)" as promulgated by the American National Standards Institute. Based on the design of the standard E-13B character set, in order that a MICR reader reliably read with a high correct character read rate and with a very low substitution rate, the document velocity must be precisely known during reading or otherwise be speed-controlled so that it does not vary.

In fact, typical designs for reliable MICR reading generally involve rather complex schemes for controlling the velocity of the document or attempting to measure its velocity at different times as the document moves past the MICR read head. It is easy to understand that these schemes have a tendency to increase design, processing, and manufacturing costs.

One such scheme is shown in U.S. Pat. No. 5,134,663, which describes a center-line magnetic ink character recognition system. By establishing a center line between the first and last peaks of a character, and working from the center line, errors due to speed are not accumulated at the end of the character with respect to the beginning scan read of the character. Similarly, U.S. Pat. No. 4,143,355 describes a character recognition system. This system generates clock pulses for use in detecting and decoding characters printed on a document derived from a mechanical clock pulse encoder moving in synchronism with the relative movement by the reading head of the system. The system shown in U.S. Pat. No. 5,091,961 describes a magnetic ink character decoder. A bank check reader operates without the necessity of a constant rate of check movement by imposing a set of flux reversals over the magnetic ink characters to be read. The flux reversals permit a pulse count sequence to be generated that is unique to each magnetic ink character independent of the rate of check movement. Although these approaches address problems associated with document velocity, there is still a need for an improved low-cost method of MICR character reading without the need for controlling the velocity of the document.

In order to reduce the costs of processing check payments and speed up the processing of check based payments to reduce fraud, the banking industry is developing various means of truncating the paper check at either the Point of Sale, the merchant depositor or within the bank of first deposit. In these cases, it is extremely important that the MICR read rate approach 100% with a substitution rate near zero percent because the original document may no longer be available to allow error correction when an error is detected later in the processing stream. While it has been cost effective to provide sophisticated methods with redundancy in centralized high-speed reader/sorters to improve upon the MICR read rate and reduce substitutions, the challenge is to provide improved MICR read performance in low cost systems that are positioned at the Point-of-Sale or at the teller window.

One such system may be seen in U.S. Pat. No. 4,087,789, which shows a complex recognition system for high speed MICR recognition that uses a matrix read system. Each character to be recognized is divided into a number of discrete vertical segments, each segment being individually magnetized by an ac-write head. The velocity at which the document is transported is sensed and time-correlated to the magnetization of each discrete segment to avoid irregularly spaced magnetization due to non-uniformities in transport velocity. However, the single gap magnetic read head is used for typical low speed MICR readers because those markets require a low cost MICR reader for applications such as at a teller window or at a Point-of-Sale.

In addition to problems associated with document velocity, electromagnetic noise is also a problem. In the environment of reading MICR from a check at a Point-of-Sale terminal there is considerable magnetic noise produced by the checkout conveyor system, receipt printer, the cash register, and the motor within the MICR reader itself. Several solutions have been proposed. One proposed solution is set forth in U.S. Pat. No. 5,887,075, which describes a method, apparatus, and article of manufacture for filtering periodic noise from a magnetic read head. Specifically, samples known not to contain a desired signal are used to extract a waveform representative of a single period of periodic noise. The representative waveform is synchronized with samples containing the desired signal and used to compensate the samples containing the desired signal in order to minimize, reduce, cancel or remove the effects of the periodic noise. U.S. Pat. No. 5,959,279 describes a magnetic pattern recognition method and apparatus capable of preventing magnetic noise from the stepper motor from affecting MICR character recognition processing while the stepper motor transports a document containing MICR characters. Many cycles of stepper motor noise signals are obtained to determine an average of the noise signals, which are then subtracted synchronously from the raw detection signals, to obtain the MICR character recognition data. Further, some known signal processing techniques that address noise are described in *Signal Processing Using Analog And Digital Techniques*, K. G. Beauchamp (New York: John Wiley & Sons, 1973), pp. 400–467. Although these approaches address noise reduction, as stated above, there is still a need for a low-cost solution of MICR character reading, which is suitable for low signal MICR documents in an environment that includes substantial magnetically or electrically induced noise that provides distortion in the MICR waveforms.

SUMMARY OF THE INVENTION

It is, therefore, an object of the present invention to provide an improved system and method of signal processing for use in reading sensed data without the need for controlling the velocity of the document.

It is another object of the present invention to provide an improved system and method of signal processing for use in reading sensed data that reduces the effects of magnetically and electrically induced noise.

In carrying out the above objects, a method of signal processing for use in reading data is provided. The method comprises determining a first waveform by reading the data, and determining a second waveform by reading the data at a different time than the first reading. The first waveform includes coherent information representing the data and includes incoherent noise. The second waveform also includes coherent information representing the data and includes incoherent noise. The method further comprises determining a cross-correlation of the first waveform with the second waveform as a function of time delay, and determining a specific time delay corresponding to a maximum peak in the cross-correlation function. A filter is then applied based on the specific time delay. The filter combines the first waveform and the second waveform so as to generate a filter output waveform. The filter output waveform includes coherent information representing the data and includes reduced incoherent noise.

Methods of the present invention are suitable for many purposes, and in a preferred implementation, the first and second waveforms are determined by reading the data with a dual head magnetic ink character recognition reader having a first head and a second head. The first head and the second head define a distance therebetween. The method further comprises determining a velocity based on the specific delay and the distance between the first head and the second head. The filter output waveform is then scaled based on the velocity. This scaling is useful when the output waveform is to be compared to peak profiles for known magnetic ink characters. Further, in this preferred implementation, the method further comprises recognizing a magnetic ink character based on the scaled filter output waveform.

In a preferred implementation, the first waveform is represented by variable vector f, the second waveform is represented by variable vector g, and the cross-correlation is denoted as R. The cross-correlation is determined substantially according to:

$$R_\tau = \frac{1}{K} \sum_{k=0}^{K-1} f_k \cdot g_{k+\tau}$$

where K is a total number of samples, and $\tau$ is the time delay.

Further, in a preferred implementation, the filter output waveform is represented by variable vector c, and is determined substantially according to:

$C_k = |f_k| \cdot g_{k+\tau}$ for $\tau$=the specific time delay.

The preferred implementation using the equations given above is suitable for applications that read data with a dual head magnetic ink character recognition reader. As such, the preferred method further comprises determining a velocity, scaling the filter output waveform based on the velocity, and recognizing a magnetic ink character based on the scaled filter output waveform. It is appreciated that the scaled filter output waveform may represent one or any number of magnetic ink characters. In addition, it is appreciated that the term substantially as used above when referring to determinations made according to the given equations means that minor modifications may be made to the equations to the extent that the original equations are recoverable. For example, offset and gain may be accounted for in hardware or in software by modifying the given equations to account for mean values and standard deviations as readily understood by one of ordinary skill in the art.

Further, in carrying out the present invention, a system for use in reading character data printed in magnetic ink is provided. The system comprises a dual head magnetic ink character recognition reader, a circuit, correlation computation logic, and a filter. The reader has a first head and a second head. The first head and the second head define a distance therebetween. The circuit determines a first waveform when the first head reads the data, and determines a second waveform when the second head reads the data at a different time than the first reading. The first waveform includes coherent information representing the data, and includes incoherent noise. The second waveform includes coherent information representing the data, and includes incoherent noise. The correlation computation logic determines a cross-correlation of the first waveform with the second waveform as a function of time delay. Correlation computation logic further determines a specific time delay corresponding to a maximum peak in the cross-correlation function. The filter, based on the specific time delay, combines the first waveform and the second waveform so as to generate a filter output waveform. The filter output waveform includes coherent information representing the data and includes reduced incoherent noise.

A preferred system further comprises processing logic for determining a velocity based on the specific time delay and the distance between the first head and the second head. The processing logic also scales the filter output waveform based on the velocity. Further, the preferred system includes recognition logic for recognizing a magnetic ink character based on the scaled filter output waveform.

In addition, in a preferred implementation, a system of the present invention determines the cross-correlation and determines the filter output waveform substantially in accordance with the equations given previously.

The advantages associated with embodiments of the present invention are numerous. For example, although methods of the present invention are suitable for many signal processing applications, embodiments of the present invention are particularly useful in a character reading system for characters printed with magnetic ink and magnetized wherein there is a dual head magnetic ink character recognition reader. The reader may be a dual gap reader with the first and second read heads sharing a flux path or may be formed of two independent signal gap read heads with the first head and the second head placed in close proximity to each other. In a magnetic ink character reading application of the present invention, the characters are first magnetized prior to the characters being presented past the read heads. First and second waveforms result from the characters passing the first and second read heads, respectively. The specific time delay corresponding to a maximum peak in cross-correlation is determined. Knowing the specific time delay allows a filter to be applied that generates a filter output waveform including coherent information representing the data and including reduced incoherent noise. Filtering is followed by scaling and recognition.

The above objects and other objects, features, and advantages of the present invention are readily apparent from the following detailed description of the preferred embodiment when taken in connection with the accompanying drawings.

BRIEF DESCRIPTION OF THE DRAWINGS

FIG. 1 shows the outline and shape of the fourteen characters and symbols which are called the E-13B MICR character set as used on many financial payment documents;

FIGS. 2A–2C show the set of waveforms for the E-13B characters and symbols as read from a responsive magnetic signal gap read head when the magnetized characters (on the paper) are passed by the magnetic read head from left to right;

DETAILED DESCRIPTION OF THE PREFERRED EMBODIMENT

FIG. 1 is the E-13B character set containing ten characters and four symbols as defined in the American National Standard X9.27-2000 "Print And Test Specifications For Magnetic Ink Printing (MICR)" as promulgated by the American Bankers Association. When used on a document for automated machine reading, the characters and symbols in the set must be printed using magnetic ink. ANS X9.27 defines the dimensions of each character/symbol and the expected nominal waveform peak position and relative amplitude of waveform peaks.

Figure 2A:
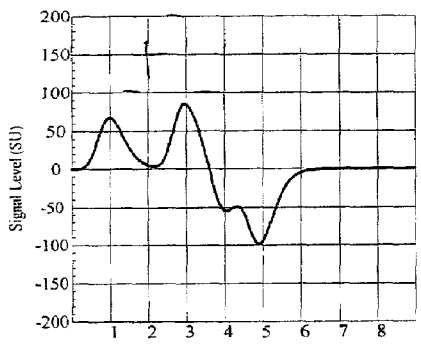
Figure 2A:
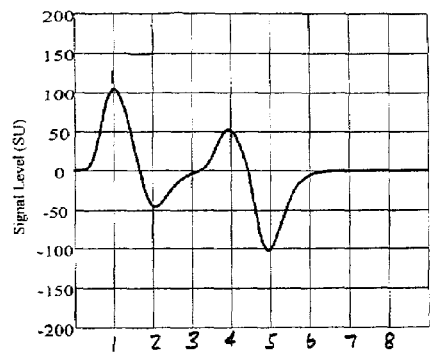
Figure 2A:
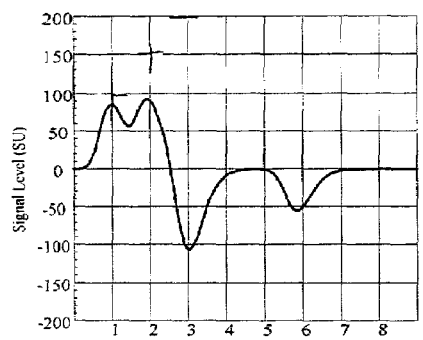
Figure 2A:
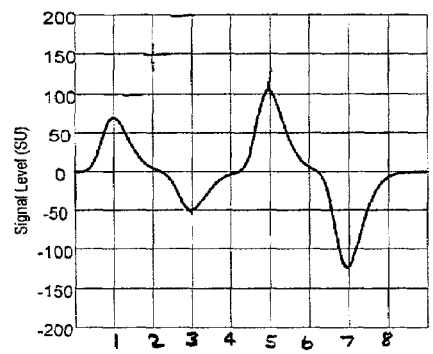
Figure 2A:
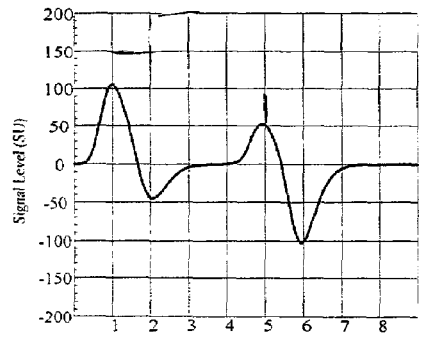
Figure 2A:
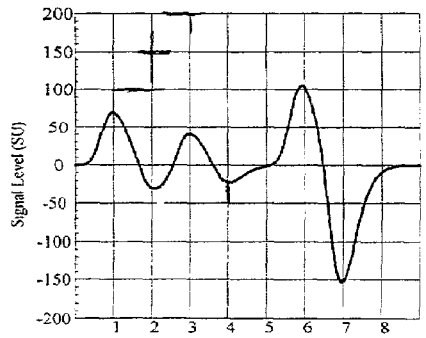
Figure 2C:
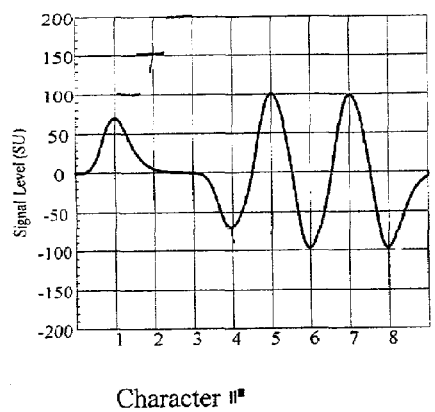
Figure 2C:
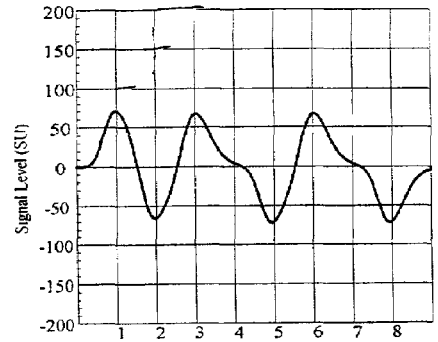

FIGS. 2A, 2B and 2C demonstrate the waveform details of each of the characters/symbols shown in FIG. 1 when each character/symbol is moved past a single gap magnetic read head at a given constant velocity. In most applications, the characters are first magnetized prior to the characters being presented past the read heads. As shown, each unit on the x-axis represents 0.013 inches. The first character peak is aligned with the first position and the remaining peaks generally align with other vertical grid lines because the MICR character/symbols are designed using increments of 0.013 inches in the horizontal direction. For those cases where the change in magnetic flux is not perfectly aligned, it is caused by the effects of the radii shifting the position of the maximum rate of change to the left. Examples are the character 3, FIG. 1, with the 6 radii at the left of the character and the character 0, FIG. 1, with the large interior radii and large outside radii at the left hand stroke. The normalized waveforms in FIG. 2A illustrate the fourth peak shift to the left for the character 3 and the waveform in FIG. 2B shows the left shift of both peaks 3 and 4 for the character 0. Normally, in order to produce waveforms where the peaks correspond to known dimensions such as 0.013 inches, the velocity of the characters passing the read heads must be precisely set. Otherwise, the character peaks will be out of scale. Embodiments of the present invention utilize cross-correlation to overcome the normally strong dependence on document velocity. In addition, embodiments of the present invention utilize filtering to reduce incoherent noise.

Figure 3:
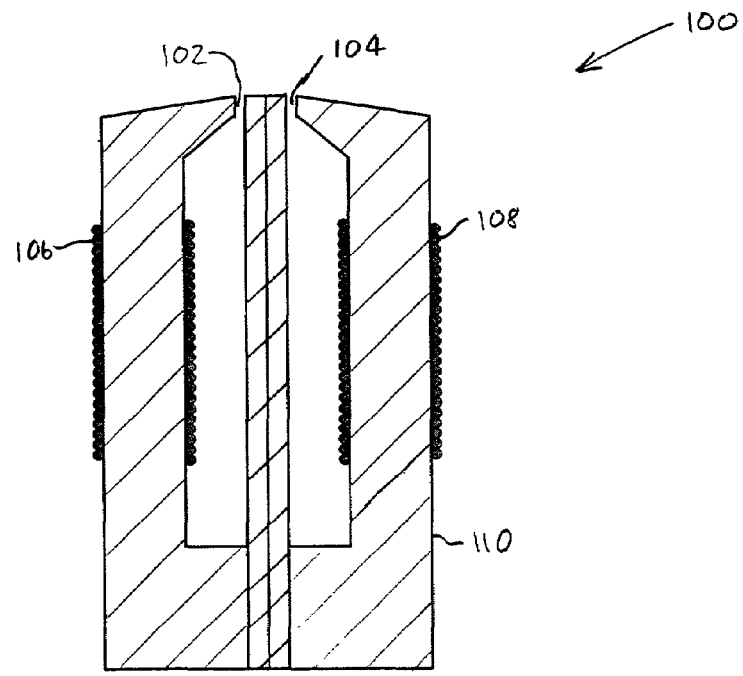
FIG. 3 is a cross-section view of a dual gap read head for use in methods and systems of the present invention.

FIG. 3 illustrates a suitable dual head magnetic ink character recognition reader of the dual gap type. The reader is generally indicated at 100, where first and second read heads are formed by the first and second gaps 102 and 104, respectively. The first read head utilizes sensing coil 106, while the second read head utilizes sensing coil 108. Core 110 forms a path for the magnetic flux changes experienced when the reader passes over magnetic ink. Of course, it is appreciated that alternative readers may be used such as two independent closely spaced read heads. In addition, any suitable technique may be utilized for assuring that flux variation from the magnetic ink characters is sensed by each read head gap and that a voltage is induced in each respective coil.

Figure 4:
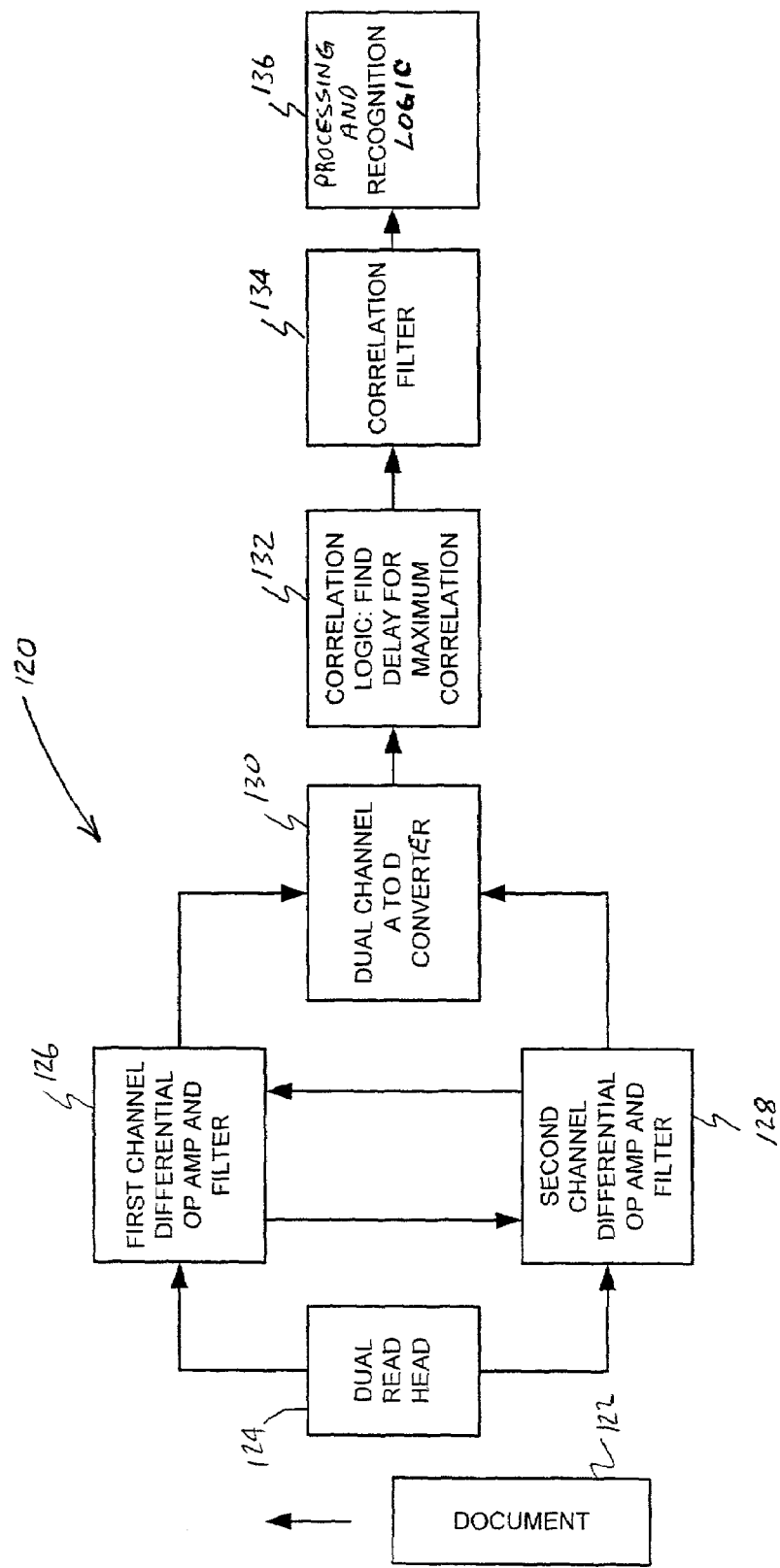
FIG. 4 is block diagram illustrating a system of the present invention for use in reading character data printed in magnetic ink.

FIG. 4 is an illustration of a system in a preferred embodiment of the present invention. Document 122 includes magnetic ink characters. A dual read head 124 is used to feed two similar differential input operational amplifiers 126 and 128, respectively. The amplifiers provide the independent 4 pole RC band pass filtering in accordance with the ANS X9.27 requirements to smooth out the effects of irregular edge and void defects within the MICR printing. See Annex B of ANS X9.27-2000, Part 3, for a reference design of typical MICR amplifiers. The differential operational amplifiers are cross-connected to subtract a portion of signal from each head from the other to cancel any cross-talk from one head gap to another. In some head designs up to one-half of the signal from each head may be induced from the other head because of the use of a common center pole piece (FIG. 3) for the dual gap head construction. As mentioned previously, if the system were implemented with two independent closely spaced read heads then the cross talk between these heads would be negligible and the two differential amplifiers would need no cross connection.

Following the filtering of the signals from each head, the signals are applied to a dual channel analog to digital converter 130. A typical converter is the Maxim MAX144, which provides a two channel, serial 12 bit output for up to 108,000 samples per second (9.26 microseconds per sample).

Again, it is appreciated that FIGS. 3 and 4 illustrate a preferred implementation of the present invention for a magnetic ink reading application. Many variations may be made to the hardware and/or software to achieve methods of signal processing for use in reading data, and systems for use in reading character data printed in magnetic ink, in accordance with the present invention. Continuing with reference to FIG. 4, the 12 bit digitized samples output from analog-to-digital converter 130 are stored in a random access memory (not shown). The start of the digitized sampling by converter 130 may be initiated when the start of the document 122 passes the MICR read head and a signal from the leading head amplifier is detected that exceeds a certain predetermined voltage threshold above the average noise level when no document is present. This indicates that at the first sign of a waveform signal other waveform signals will soon follow. Alternatively, an optical sensor in the document track may be used to sense that a document is present to start the digitization samples. The end of the document passing a typical optical sensor using a LED and a phototransistor that is located near the MICR read head will determine the end of sampling. The use of these optical sensors for determining the presence and length of a document are very typical in the character reading of remittance documents and checks.

On a practical matter, analysis was done using samples taken at 20 microsecond intervals from a dual gap read head, which was installed in a Unisys SourceNDP document reader where the document track speed was approximately 14.2 inches per second. With samples taken every 20 microseconds it provides for 3516 samples per inch or one sample every 0.000284 inch. As long as the sample rate is greater than 1000 samples per inch at whatever velocity the document is expected to run at, enough accuracy should be maintained in order to achieve reliable character recognition.

Once the waveform signals are sampled in the analog-to-digital converter 130, they are passed to digital signal processing circuitry, which preferably includes correlation computation logic 132, correlation filter 134, and processing and recognition logic 136 for doing correlation computation. It will be understood from the following discussion that the digital signal processing circuitry may be implemented in any suitable fashion, such as a digital signal processor, and that such implementation may be via software or hardware.

Upon receiving the waveform signals from A/D converter 130, correlation logic 132 performs the correlation computation of the two signals, by cross-correlating the first waveform with the second waveform as a function of time delay. The number of samples taken to form each of the first and second waveforms for analysis is approximately equal to the width of one or two MICR characters (e.g., 0.125 inches to 0.25 inches). As shown in FIG. 4, and as set forth in more detail below, correlation logic 132, correlation filter 134, and processing and recognition logic 136 cooperate to use the first and second digitized waveforms received from converter 130 to determine one or more characters from the character set of FIG. 1.

More specifically, the specific time delay corresponding to a maximum peak in the cross-correlation function is determined and it is this specific time delay value that indicates how much time passes when a specific point on the document moves from the first read head to the second read head. Since head spacing is known, this specific time delay also allows document velocity to be determined, thus overcoming the common document velocity problems of some existing systems without requiring overly expensive system components.

Once this specific time delay value is found, the correlation filter 134 is applied. The preferred filter, the correlation filter 134, is preferably a software-implemented program which calculates a multiplication of the absolute value of the first waveform samples by the value of the second time shifted waveform samples. The absolute value of one of the waveform samples is used to preserve the sign of the other waveform samples. If the absolute value were not taken, the resulting waveform would have no negative values. The sample number that the second waveform is shifted is equal to the specific time delay value found as described above for maximum correlation. The number of samples in the output of the correlation filter will be the same number as there are input samples. Thereafter, the output waveform of the correlation filter has substantially reduced noise. The reason that the noise is reduced is that multiplication by a zero value from either input waveform produces a zero in the resultant output waveform. The important property of each input waveform is that the average value is zero. This occurs with magnetically sensed waveforms because the output voltage is the derivative of the flux sensed. The waveform resulting from this technique may be more easily recognized by the recognition algorithm because a scaling factor is generated for each group of waveform samples that is correlated, and that scaling factor is used along with the waveform from the correlation filter to perform character recognition using any suitable methods.

Of course, it is appreciated that embodiments of the present invention are not limited to any specific hardware or software implementation and that the description herein is exemplary. For example, the cross-correlation and filter output waveform (correlation filter output) equations are exemplary.

FIGS. 5–9 illustrate various waveforms and functions in an exemplary reading of the MICR digit for the character zero.

Figure 5:
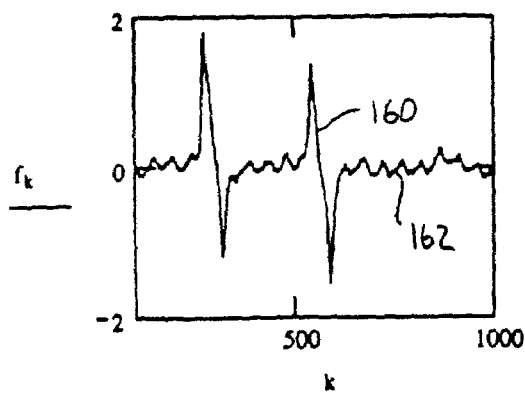
FIGS. 5–9 illustrate the various waveforms and other functions in an exemplary reading of the MICR character zero in accordance with a method of signal processing of the present invention.
Figure 6:
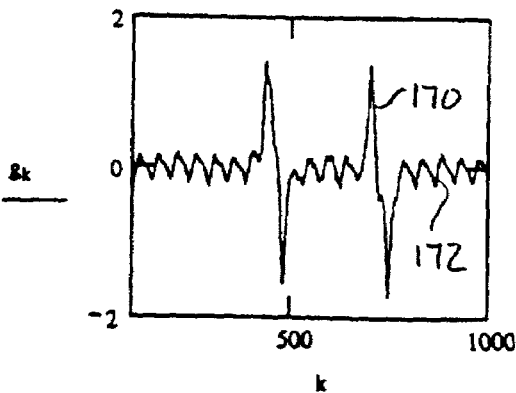
Figure 7:
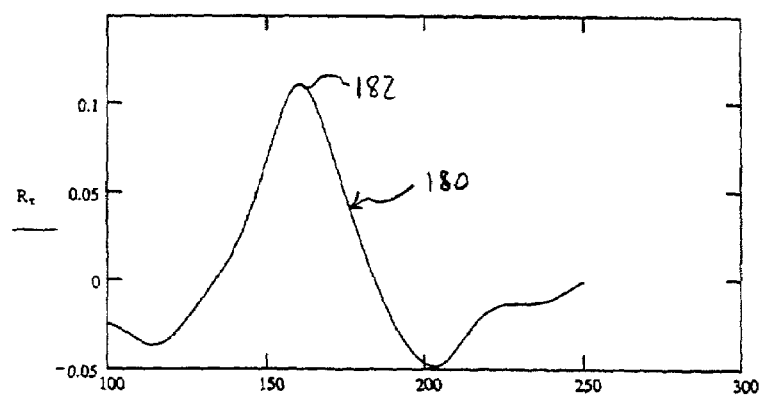

FIG. 5 illustrates the first waveform from the first read head, and FIG. 6 illustrates the second waveform from the second read head. The first waveform (FIG. 5) includes coherent information 160 and also includes incoherent noise 162. The second waveform (FIG. 6) includes coherent information 170 and also includes incoherent noise 172. The cross-correlation of the first waveform with the second waveform via correlation logic 132 as a function of time delay is illustrated in FIG. 7 at 180. A suitable technique for determining the cross-correlation, R, is:

$$R_\tau = \frac{1}{K}\sum_{k=0}^{K-1} f_k \cdot g_{k+\tau}$$

Of course, various modifications may be made to the equation such as accounting for offset and gain. The specific time delay corresponding to a maximum peak 182 in the cross-correlation function is then determined by visual examination. In FIG. 7, where the x-axis represents the sample number, the specific delay is equal to approximately 160 samples.

Figure 8:
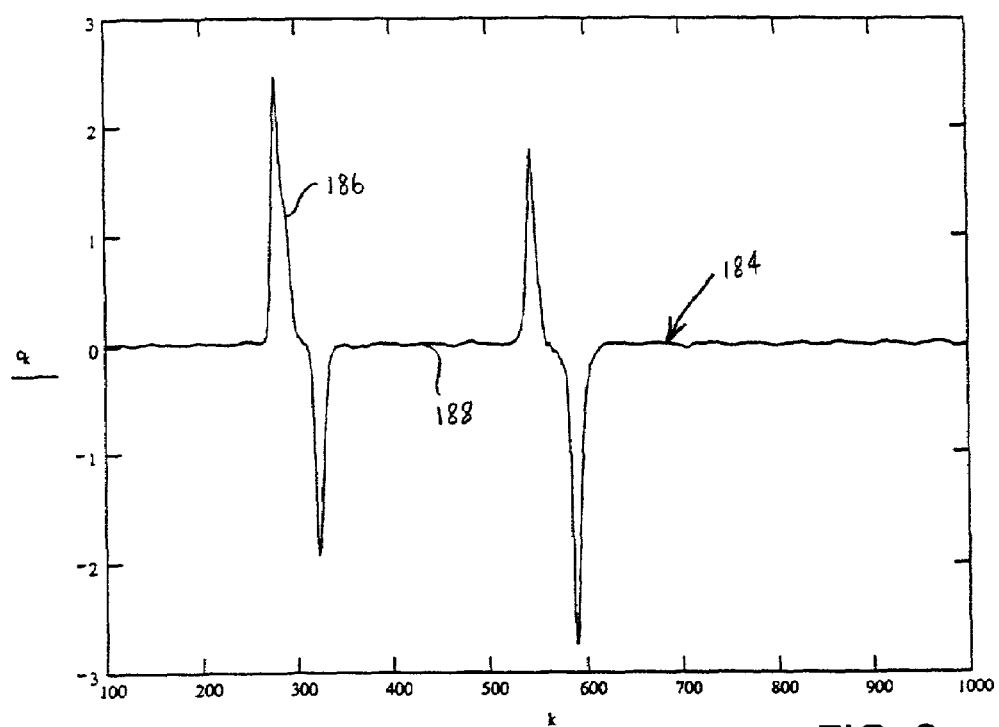

Applying a filter based on the specific time delay with the filter combining the first waveform and the second waveform generates a filter output waveform as shown in FIG. 8 at 184, including coherent information 186 and reduced incoherent noise 188. A suitable equation for determining the filter output waveform is:

$$C_k = |f_k| \cdot g_{k+\tau} \text{ for } \tau = \text{the specific time delay.}$$

Of course, modifications may be made to this equation to, for example, account for offset and gain.

Figure 9:
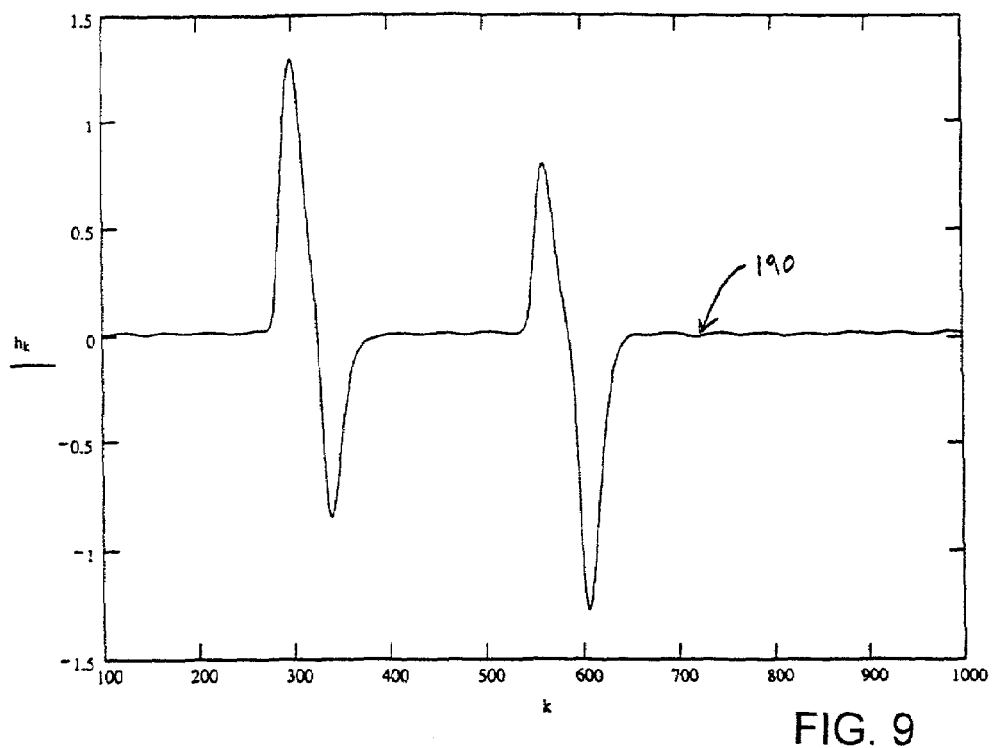

It is appreciated that where the waveforms (FIGS. 5 and 6) are dissimilar, that is, the incoherent noise, a large measure of cancellation of the positive and negative samples of one waveform will occur because the other waveform is nearly at a zero value at the shifted time sample. In general, cross products for uncorrelated signals, that is, noise or time shifted interference, will tend to be zero, while cross products of correlated signals will be multiplied. That is, the coherent information is multiplied while the incoherent noise is reduced. The preferred filter uses the absolute value of the first function in order to keep the sign of the second function and prevent the waveform from being entirely positive. FIG. 8 illustrates amplitude that has a squared function and distortion of peak amplitude is observed when visually evaluating, however, for character recognition, the squaring of the amplitude of all peaks can be easily accommodated for in the recognition algorithms. Applying conventional filtering to all waveforms in accordance with the ANSI standard ANS X9.27 provides a typical waveform for a character zero as shown in FIG. 9 at 190. It shall be apparent by linear system theory that the conventional filtering and wave shaping may precede or follow the cross-correlation process and correlation filter. The final result will be the same. Subsequent peak position analysis is then performed as understood by one of ordinary skill in the art.

Figure 10:
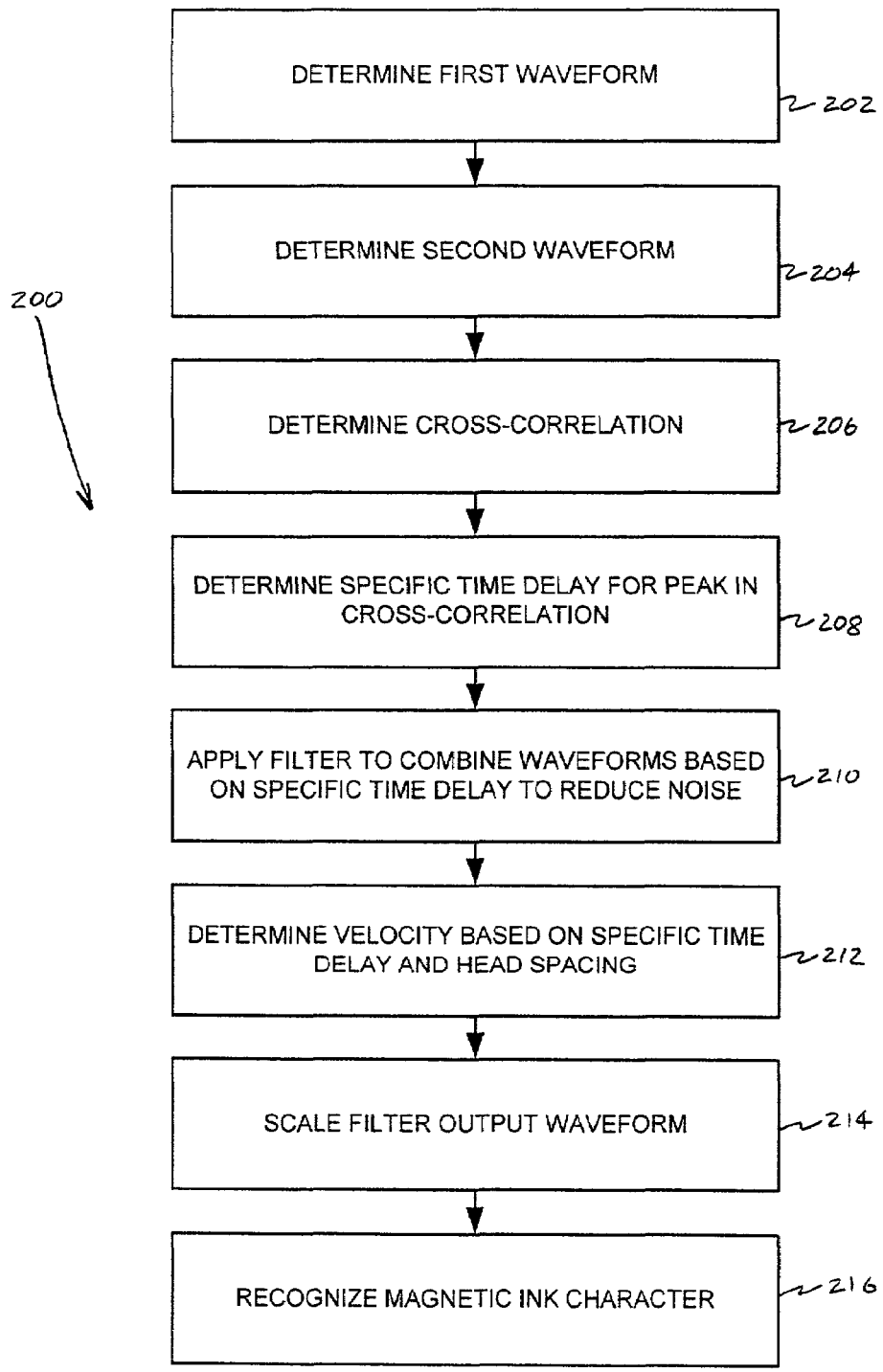
FIG. 10 is a block diagram illustrating a preferred method of the present invention.

FIG. 10 illustrates a method of the present invention in a block diagram at 200. At blocks 202 and 204, first and second waveforms are determined. At block 206, cross-correlation is determined. At block 208, a specific time delay for a maximum peak in the cross-correlation function is determined. This specific time delay represents the time delay between a specific point on the document passing from one read head to the next read head. This specific time delay value allows calculation of document velocity that may later be used for scaling. At block 210, a filter is applied to combine the two waveforms based on the specific time delay, reducing noise. More specifically, coherent information present in the data in both the first and second waveforms passes through the filter while the incoherent noise of the first and second waveforms is reduced. One example of a suitable filter is the correlation filter described previously. At block 212, velocity is determined based on the specific time delay and read head spacing. At block 214, the filter output waveform is scaled to allow comparison to peak profiles such as those shown in FIGS. 2A–2C. At block 216, magnetic ink characters are recognized.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of signal processing for use in reading data, the method comprising:

determining a first waveform by reading the data, the first waveform including coherent information representing the data and including incoherent noise;

determining a second waveform by reading the data at a different time than the first reading, the second waveform including coherent information representing the data and including incoherent noise;

determining a cross-correlation of the first waveform with the second waveform as a function of time delay;

determining a specific time delay corresponding to a maximum peak in the cross-correlation function; and applying a filter based on the specific time delay, the filter combining the first waveform and the second waveform so as to generate a filter output waveform including coherent information representing the data and including reduced incoherent noise.

2. The method of claim 1 wherein the first and second waveforms are determined by reading the data with a dual head magnetic ink character recognition reader having a first head and a second head, the first head and the second head defining a distance therebetween.

3. The method of claim 2 further comprising:

determining a velocity based on the specific time delay and the distance between the first head and the second head; and scaling the filter output waveform based on the velocity.

4. The method of claim 3 further comprising:

recognizing a magnetic ink character based on the scaled filter output waveform.

5. The method of claim 1 wherein the first waveform is represented by variable vector f, the second waveform is represented by variable vector g, and the cross-correlation, R, is determined substantially according to:

$$R_\tau = \frac{1}{K} \sum_{k=0}^{K-1} f_k \cdot g_{k+\tau}$$

where K is a total number of samples, and $\tau$ is the time delay.

6. The method of claim 5 wherein the filter output waveform is represented by variable vector c, and is determined substantially according to:

$$C_k = |f_k| \cdot g_{k+\tau} \text{ for } \tau = \text{the specific time delay.}$$

7. The method of claim 6 wherein the first and second waveforms are determined by reading the data with a dual head magnetic ink character recognition reader having a first head and a second head, the first head and the second head defining a distance therebetween.

8. The method of claim 7 further comprising:

determining a velocity based on the specific time delay and the distance between the first head and the second head; and scaling the filter output waveform based on the velocity.

9. The method of claim 8 further comprising:

recognizing a magnetic ink character based on the scaled filter output waveform.

10. A system for use in reading character data printed in magnetic ink, the system comprising:

a dual head magnetic ink character recognition reader having a first head and a second head, the first head and the second head defining a distance therebetween;

a circuit for determining a first waveform when the first head reads the data, the first waveform including coherent information representing the data and including incoherent noise, and for determining a second waveform when the second head reads the data at a different time than the first reading, the second waveform including coherent information representing the data and including incoherent noise;

correlation computation logic for determining a cross-correlation of the first waveform with the second waveform as a function of time delay, and for determining a specific time delay corresponding to a maximum peak in the cross-correlation function; and a filter based on the specific time delay, the filter combining the first waveform and the second waveform so as to generate a filter output waveform including coherent information representing the data and including reduced incoherent noise.

11. The system of claim 10 further comprising:
processing logic for determining a velocity based on the specific time delay and the distance between the first head and the second head, and for scaling the filter output waveform based on the velocity.

12. The system of claim 11 further comprising:
recognition logic for recognizing a magnetic ink character based on the scaled filter output waveform.

13. The system of claim 10 wherein the first waveform is represented by variable vector f, the second waveform is represented by variable vector g, and the cross-correlation, R, is determined substantially according to:

$$R_\tau = \frac{1}{K}\sum_{k=0}^{K-1} f_k \cdot g_{k+\tau}$$

where K is a total number of samples, and $\tau$ is the time delay.

14. The system of claim 13 wherein the filter output waveform is represented by variable vector c, and is determined substantially according to:

$$C_k = |f_k| \cdot g_{k+\tau} \text{ for } \tau = \text{the specific time delay.}$$

15. The system of claim 14 further comprising:
processing logic for determining a velocity based on the specific time delay and the distance between the first head and the second head, and for scaling the filter output waveform based on the velocity.

16. The system of claim 15 further comprising:
recognition logic for recognizing a magnetic ink character based on the scaled filter output waveform.

* * * * *